US009982824B2

(12) United States Patent
Koenig

(10) Patent No.: US 9,982,824 B2
(45) Date of Patent: May 29, 2018

(54) DEVICE FOR REDUCED-NOISE FASTENING OF PIPES OR HOSES

(71) Applicant: Walter Stauffenberg GmbH & Co. KG, Werdohl (DE)

(72) Inventor: Ulrich Stefan Koenig, Herscheid (DE)

(73) Assignee: Walter Stauffenberg GmbH & Co. KG, Werdohl (DE)

( * ) Notice: Subject to any disclaimer, the term of this patent is extended or adjusted under 35 U.S.C. 154(b) by 1 day.

(21) Appl. No.: 15/112,223

(22) PCT Filed: May 20, 2015

(86) PCT No.: PCT/EP2015/061043
§ 371 (c)(1),
(2) Date: Jul. 18, 2016

(87) PCT Pub. No.: WO2015/177181
PCT Pub. Date: Nov. 26, 2015

(65) Prior Publication Data
US 2016/0334044 A1  Nov. 17, 2016

(30) Foreign Application Priority Data
May 20, 2014  (DE) .................... 20 2014 102 354 U

(51) Int. Cl.
*F16L 3/00* (2006.01)
*F16L 55/035* (2006.01)
*F16L 3/10* (2006.01)

(52) U.S. Cl.
CPC .......... *F16L 55/035* (2013.01); *F16L 3/1075* (2013.01); *F16L 3/1091* (2013.01)

(58) Field of Classification Search
CPC ......... F16L 3/10; F16L 55/035; F16L 3/1075; F16L 3/1091
(Continued)

(56) References Cited

U.S. PATENT DOCUMENTS 3,564,676 A * 2/1971 Oeser .................... F16L 3/1016
24/279
3,606,218 A * 9/1971 Enlund ................. F16L 3/1091
248/74.2
(Continued)

FOREIGN PATENT DOCUMENTS

DE  31 28 496 A1  2/1983
EP   1 493 954 A1  1/2005
(Continued)

OTHER PUBLICATIONS

International Search Report of PCT/EP2015/061043, dated Jul. 23, 2015.

*Primary Examiner* — James Hook
(74) *Attorney, Agent, or Firm* — Collard & Roe, P.C.

(57) ABSTRACT

A device for reduced-noise fastening of pipes or hoses includes two fastening parts which are connectable to one another and which have recesses which, in the assembled state, form a leadthrough in which there is arranged a vibration-damping ring-shaped insert, the internal contour of which is designed for receiving a pipe or hose. The insert is formed by a hollow cylindrical main body, on the outer shell surface of which there are arranged, spaced apart from one another, two encircling radially outwardly projecting webs, wherein, in the leadthrough of the fastening parts, there is arranged a radially encircling central web which engages into a groove formed between the webs of the insert.

11 Claims, 2 Drawing Sheets

Figure 1:
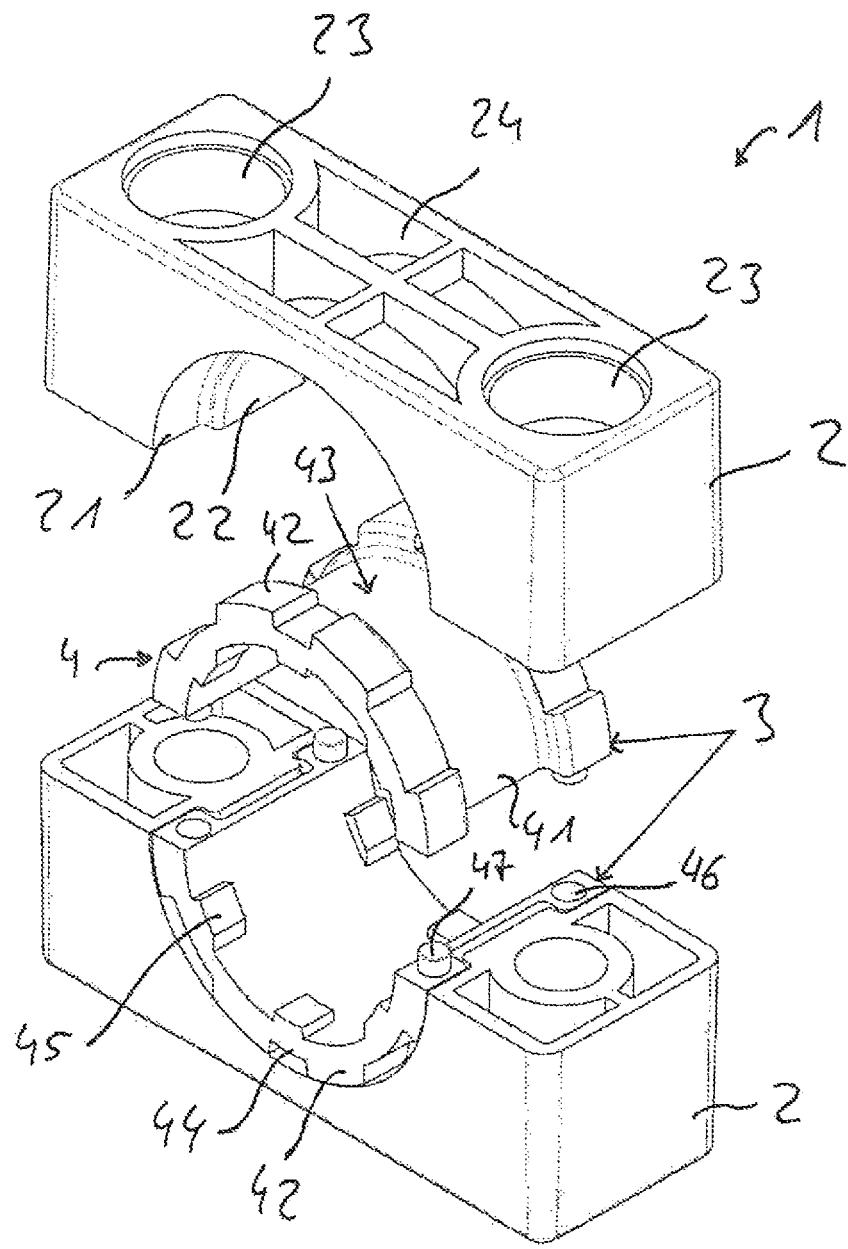

(58) Field of Classification Search
USPC .......................................... 138/106, 99, 110
See application file for complete search history.

(56) References Cited

U.S. PATENT DOCUMENTS

| | | | | |
|---|---|---|---|---|
| 3,716,650 | A * | 2/1973 | de Mecquenem | H02G 7/12 174/146 |
| 3,894,309 | A * | 7/1975 | Yuda | B65D 59/00 16/2.1 |
| 4,391,300 | A * | 7/1983 | Saylor | F16L 55/172 138/99 |
| 4,768,813 | A * | 9/1988 | Timmons | F16L 21/06 138/99 |
| 4,784,363 | A | 11/1988 | Brown et al. | |
| 5,190,324 | A * | 3/1993 | Bird | F16L 21/08 285/328 |
| 5,480,193 | A * | 1/1996 | Echols | F16L 21/06 285/318 |
| 6,305,719 | B1 * | 10/2001 | Smith, Jr. | F16L 55/175 138/99 |
| 6,352,369 | B1 * | 3/2002 | Berninger | B25J 19/0025 384/273 |
| 6,761,189 | B2 * | 7/2004 | Berninger | B25J 19/0025 138/104 |
| 8,622,092 | B1 * | 1/2014 | Condon | F16L 3/10 138/106 |
| 2009/0140106 | A1 | 6/2009 | Johnson et al. | |
| 2012/0217353 | A1 | 8/2012 | Hennon | |

FOREIGN PATENT DOCUMENTS

| | | |
|---|---|---|
| EP | 2 072 874 A1 | 6/2009 |
| EP | 2 149 732 A2 | 2/2010 |

\* cited by examiner

DEVICE FOR REDUCED-NOISE FASTENING OF PIPES OR HOSES

CROSS REFERENCE TO RELATED APPLICATIONS

This application is the National Stage of PCT/EP2015/061043 filed on May 20, 2015, which claims priority under 35 U.S.C. § 119 of German Application No. 20 2014 102 354.2 filed on May 20, 2014, the disclosure of which is incorporated by reference. The international application under PCT article 21(2) was not published in English.

The invention relates to an apparatus for vibration-reduced and noise-reduced fastening of pipes or hoses.

What are called clamps are regularly used for fastening pipes and hoses; these regularly comprise a clamp body that is produced from a thermoplastic or elastomer plastic or also from metal. In this regard, the clamp body is frequently formed from two fastening parts that can be connected with one another, which parts form a passage for accommodation of the pipe or of the hose. In Germany, such clamps are standardized according to DIN 3015. For reduction of vibrations that are transferred from the accommodated pipe or hose to the clamp body, it is known to insert a ring-shaped rubber insert in the passage of the clamp body, to accommodate the pipe or the hose. For axial fixation of the rubber insert, the latter is provided with a formed-on crosspiece that runs circumferentially in the center and engages into a groove introduced into the center of the passage of the clamp.

The previously known solution has proven itself in practice. In this regard; it has been shown that an increase in the noise-reducing and vibration-reducing properties is all the greater, the greater the difference between outside diameter and inside diameter of the rubber insert. At a given line diameter, however, the difference is restricted to a specific dimension by the selected size of the sheathing clamps. It is true that the noise-reducing and vibration-reducing properties can be further increased by means of a reduction of the degree of hardness of the material of the insert, but here, too, limits of production technology exist.

This is where the invention wishes to provide a remedy. The invention is based on the task of making available an apparatus for vibration-reduced and noise-reduced fastening of pipes or hoses, in which apparatus the noise-reducing and vibration-reducing properties are improved. According to the invention, this task is accomplished by means of the characteristics described herein.

With the invention, an apparatus for vibration-reduced and noise-reduced fastening of pipes or hoses is made available, in which apparatus the noise-reducing and vibration-reducing properties are increased. Because of the fact that the insert is formed by a cylindrical basic body, on the outer mantle surface of which body two circumferential crosspieces that project radially outward are disposed at a distance from one another, wherein a radially circumferential center crosspiece is disposed in the passage of the fastening parts, which crosspiece engages into a groove formed between the crosspieces of the insert, a greater difference between outside diameter and inside diameter of the insert is made possible, because the outer mantle region of the insert that lies on the inside has a smaller diameter than the outer edge region formed by the crosspieces that project outward. Furthermore, by means of this embodiment, the direct transfer path from the accommodated pipe or the accommodated hose to the metallic screws by way of which the connection of the two fastening parts with one another takes place and which have a significant influence on noise transmission is clearly increased in size.

In the following, both circular-shaped and polygon-shaped inserts will be subsumed under the term "ring-shaped insert."

In a further development of the invention, the two crosspieces are formed onto the basic body on the end side, in each instance. As a result, the central diameter-reduced region of the outer mantle surface of the insert is maximized.

In an embodiment of the invention, recesses are introduced into at least one circumferential crosspiece, preferably in both circumferential crosspieces, circumferentially at a distance from one another, thereby forming a comb-like shape. As a result, the contact surface of the circumferential crosspieces on the passage formed by the fastening parts is reduced, and thereby sound transfer is reduced. In this regard, the recesses can be continued to project into the basic body, in whole or in part, thereby reducing the material thickness of the basic body in the region of these recesses.

In a further embodiment of the invention, the inside diameter of the center crosspiece of the fastening parts is smaller than the diameter of the outer mantle surface of the basic body, wherein the crosspieces of the insert that project outward lie against the passage on both sides of the center crosspiece. As a result, the inner region of the outer mantle surface of the insert, which region is situated between the crosspieces that project outward, does not lie against the center crosspiece of the passage, and for this reason, no transfer of vibrations or noise takes place in this region. The noise-reducing and vibration-reducing properties are thereby further improved.

In a further embodiment of the invention, at least three support bodies per crosspiece, disposed at a distance from one another, are provided on the inner mantle surface of the insert, following the course of the crosspieces that project radially outward and are disposed on the outer mantle surface. As a result, contacting of the insert with the accommodated pipe or hose only in certain regions is achieved, thereby further reducing noise transfer. Depending on the case of use, shorter or also longer pipe contact surfaces can be achieved in this regard, by means of appropriate configuration of the support bodies.

In a preferred embodiment of the invention, the support bodies are disposed, in each instance, in the region of a recess introduced into the opposite crosspiece disposed on the outer mantle surface. As a result, direct structure-borne noise transfer is prevented. The structure-borne noise is essentially guided "around the corner."

In a further development of the invention, the insert is configured in multiple parts, particularly two parts. As a result, simplified installation of the insert is brought about.

In an embodiment of the invention, the insert is formed from two preferably identical halves, wherein a bore is disposed, in each instance, in the cross-section of a crosspiece that projects outward, on one side, and, on the opposite side, a pin is disposed, so that each half has two pins disposed diagonally to one another and two bores disposed diagonally to one another, in such a manner that a plug-in connection of the two halves is made possible. As a result, reliable fixation of the two halves is achieved.

Preferably, the at least two parts of the insert are connected with one another by way of a film hinge. As a result, the parts that complement one another are captively connected with one another.

In a further development of the invention, the insert is produced from an elastomer. Good results are also achieved when using a thermoplastic rubber. The significant properties of this material clearly lie above those of comparable vulcanized rubber products.

In a further embodiment of the invention, the two fastening parts are configured to be identical, at least on their sides that face one another, but preferably in total. As a result, the production effort is reduced. Furthermore, storage efforts are minimized if the fastening parts have an identical configuration.

In a further embodiment of the invention, the fastening parts are essentially formed from plastic. As a result, cost-advantageous production of fastening parts that have a long lifetime and are corrosion-resistant is made possible. Alternatively, the fastening parts can also be produced from metal, particularly aluminum, steel or stainless steel.

In an embodiment of the invention, the fastening parts are connected with one another by way of a film hinge. As a result, the parts that belong together, in each instance, are captively connected with one another.

Figure 2:
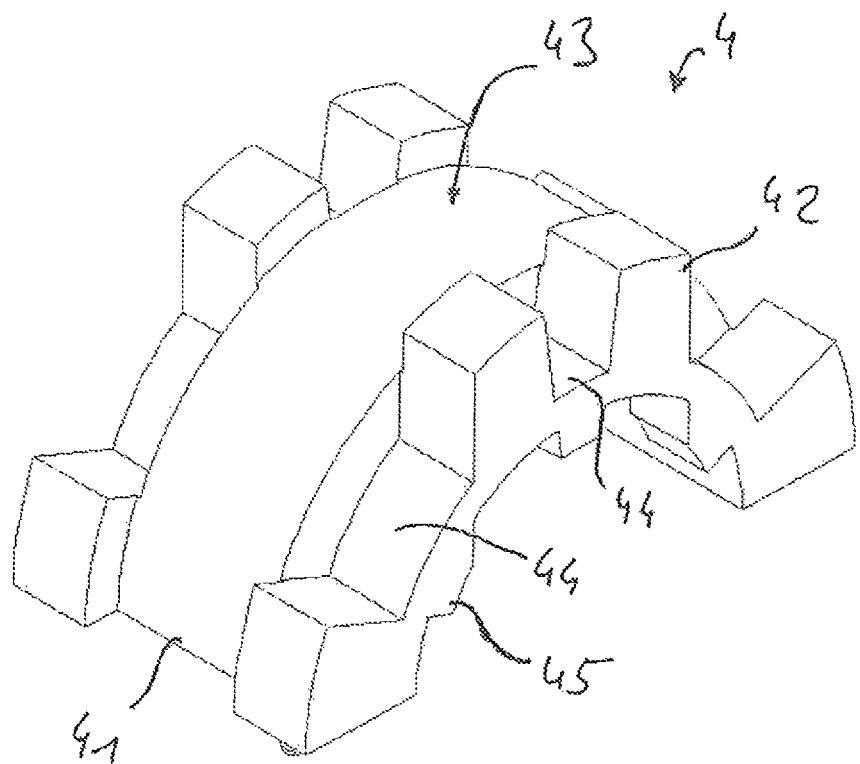

Other further developments and embodiments are indicated in the remaining dependent claims. An exemplary embodiment is shown in the drawing and will be described in detail below. The figures show:

FIG. 1 the schematic representation of an apparatus for noise-reduced fastening of pipes or hoses in a spatial exploded representation, and FIG. 2 the representation of an insert half of an insert of a further embodiment.

The apparatus for noise-reduced fastening of pipes or hoses selected as an exemplary embodiment is configured as a block-shaped pip clamp 1, which is composed of two identically configured pipe clamp halves 2 and accommodates an insert 3 that is composed of two insert halves 4.

In the exemplary embodiment, the pipe clamp halves 2 are produced from polypropylene (PP) and have a basic body configured essentially in block shape, into which a semicircular recess 21 is formed centered in the transverse direction. In the center of the semicircular recess 21, a center crosspiece 22 is formed on radially circumferentially, the width of which crosspiece approximately corresponds to half of the width of the pipe clamp half 2.

Two bores 23 are introduced into the clamp halves 2, on both sides of the recess 21, opposite one another. The bores 23 serve for passing through screws for bracing the two pipe clamp halves 2 against a pipe—not shown—accommodated by the insert 3, between the recesses 21. Furthermore, recesses 24 are introduced between the bores 23. These recesses 24 serve to save material and to reduce the weight of the pipe clamp halves 2.

In the exemplary embodiment, the insert 3 is produced from a thermoplastic elastomer and is composed of two insert halves 4 that are configured identically. The insert halves 4 consist, in each instance, of one half of a hollow cylindrical basic body 41, on the outer mantle surface of which body two circumferential crosspieces 42 that project radially outward are formed on, opposite one another, on the edge side, so that a groove 43 is formed between the crosspieces 42. Recesses 44 are introduced into the circumferential crosspieces 42, at regular intervals from one another, thereby forming a comb-like shape of the circumferential crosspieces 42. Three support bodies 45, in each instance, disposed at a distance from one another, are formed on the inner mantle surface of the insert halves 4, following the course of the crosspieces 42 that project radially outward and are disposed on the outer mantle surface. In this regard, the support bodies 45 are disposed, in each instance, at the level of a recess 44 introduced in the opposite crosspiece 42 disposed on the outer mantle surface. In the exemplary embodiment, the axial width of the support body 45 corresponds to the axial width of the circumferential crosspieces 42. In total, the insert 3 formed by the two insert halves 4 therefore has six support bodies 45 formed on both outer sides of the inner mantle of the insert 3, at a distance from one another.

For a shape-fit connection of the two insert halves 4, a bore 46 is disposed, in each instance, in the cross-section of the two identically configured insert halves 4, in the region of the crosspiece 42 that projects outward, on one side, and a pin 47 is disposed on the other side, so that each of the insert halves 4 has two pins 47 disposed diagonally relative to one another and two bores 46 disposed diagonally relative to one another. In the assembled state of the insert 3, the pins 47 of one insert half 4 engage into a bore 46 of the insert half 4 disposed opposite to the former, in each instance.

The insert 3 is inserted into the passage formed by the recesses 21 of the pipe clamp halves 2 in such a manner that the two circumferential crosspieces 42 lie against the recesses 21 on both sides of the center crosspiece 22 of the pipe clamp halves 2. In this regard, the inside diameter of the center crosspiece 22 of the pipe clamp 1 formed by the pipe clamp halves 2 is selected to be smaller than the diameter of the outer mantle surface of the basic body 41 of the insert 3 formed by the insert halves 4. The insert 3 therefore lies against the pipe clamp 1 only with the crosspieces 42, the contact surface of which has been reduced by the recesses 44. The contact surface, of the insert 3 with the pipe—not shown—that is to be accommodated is formed by the individual surfaces of the support bodies 45 disposed on the inner mantle surface of the basic body 41. Depending on the field of use, the support bodies 45 can have different configurations. Thus, for example, transition radii can be provided, thereby providing particular suitability for hose fastening.

The special geometry of the insert 3 allows control of the elasticity, beyond the degree of hardness of the material used, also by means of the shaping. In this regard, the insert 3 is passed into the two pipe clamp halves 2 by means of the two circumferential crosspieces 42, thereby clearly increasing the size of the transmission path of vibrations that occur.

In the exemplary embodiment according to FIG. 2, recesses introduced into the circumferential crosspieces 42 are continued to project into the basic body 41, thereby reducing the material thickness of the basic body 41 in the region of these recesses 44. As a result, the elasticity of the support bodies 45 disposed on the inner mantle surface of the basic body 41 in the region of the recesses is increased.

The invention claimed is:

1. Apparatus for noise-reduced fastening of pipes or hoses, comprising two fastening parts that can be connected with one another, having recesses, which form a passage in the assembled state, in which passage a vibration-damping ring-shaped insert is disposed, the inner contour of which is configured for accommodation of a pipe or hose, wherein the insert (3) is formed by a hollow cylindrical basic body (41), on the outer mantle surface of which body two circumferential crosspieces (42) that project radially outward are disposed at a distance from one another, wherein a radially circumferential center crosspiece (22) is disposed in the passage of the fastening parts (2), which crosspiece engages into a groove (43) formed between the crosspieces (42) of the insert (3), wherein recesses (44) are introduced into the two circumferential crosspieces (42), circumferentially at a distance from one another, thereby forming a comb-like shape, wherein at least three support bodies (45) per crosspiece (42), disposed at a distance from one another, are provided on the inner mantle surface of the insert (3), following the course of the crosspieces (42) that project radially outward and are disposed on the outer mantle surface, and wherein the support bodies (45) are disposed, in each instance, in the region of a recess (44) introduced into the opposite crosspiece (42) disposed on the outer mantle surface.

2. Apparatus according to claim 1, wherein the two crosspieces (42) are formed onto the basic body (41) on the end side, in each instance.

3. Apparatus according to claim 1, wherein the recesses (44) are continued to project into the basic body (41), at least in part, thereby reducing the material thickness of the basic body (41) in the region of these recesses (44).

4. Apparatus according to claim 1, wherein the inside diameter of the center crosspiece (22) of the fastening parts (2) is smaller than the diameter of the outer mantle surface of the basic body (41), wherein the crosspieces (42) of the insert (3) that project outward lie against the passage on both sides of the center crosspiece (22).

5. Apparatus according to claim 1, wherein the insert (3) is configured in multiple parts, particularly in two parts.

6. Apparatus according to claim 5, wherein the insert (3) is formed from two preferably identical halves (4), wherein a bore (46) is disposed, in each instance, in the cross-section of a crosspiece (42) that projects outward, on one side, and, on the opposite side, a pin (47) is disposed, so that each half has two pins (47) disposed diagonally to one another and two bores (46) disposed diagonally to one another, in such a manner that a plug-in connection of the two halves (4) is made possible.

7. Apparatus according to claim 5, wherein the at least two parts of the insert (3) are connected with one another by way of a film hinge.

8. Apparatus according to claim 1, wherein the insert (3) is produced from a thermoplastic elastomer.

9. Apparatus according to claim 1, wherein the two fastening parts (2) are configured to be identical, at least on their sides that face one another, but preferably in total.

10. Apparatus according to claim 1, wherein the fastening parts (2) are essentially formed from plastic.

11. Apparatus according to claim 1, wherein the fastening parts (2) are connected with one another by way of a film hinge.

\* \* \* \* \*